(12) United States Patent
Watson et al.

(10) Patent No.: US 8,014,993 B1
(45) Date of Patent: Sep. 6, 2011

(54) TRANSPORTABLE VOLUME, LOCAL ENVIRONMENT REPOSITORY

(75) Inventors: Lynn Watson, Boise, ID (US); DeVerl Stokes, Eagle, ID (US); Gregory Tew Nalder, Meridian, ID (US)

(73) Assignee: Cypress Semiconductor Corporation, San Jose, CA (US)

( * ) Notice: Subject to any disclaimer, the term of this patent is extended or adjusted under 35 U.S.C. 154(b) by 1001 days.

(21) Appl. No.: 09/715,437

(22) Filed: Nov. 16, 2000

Related U.S. Application Data

(60) Provisional application No. 60/225,528, filed on Aug. 15, 2000.

(51) Int. Cl.
  *G06F 9/44* (2006.01)
  *G06F 9/455* (2006.01)
  *G06F 9/46* (2006.01)
  *G06F 15/173* (2006.01)

(52) U.S. Cl. .............. 703/20; 703/21; 703/23; 703/25; 709/224; 718/1; 718/101

(58) Field of Classification Search .............. 703/20, 703/21, 23, 25; 718/101, 138, 1; 709/224
See application file for complete search history.

(56) References Cited

U.S. PATENT DOCUMENTS

| | | | | |
|---|---|---|---|---|
| 4,742,447 A | * | 5/1988 | Duvall et al. | 718/1 |
| 5,202,976 A | * | 4/1993 | Hansen et al. | 703/28 |
| 5,564,011 A | * | 10/1996 | Yammine et al. | 714/15 |
| 5,881,269 A | * | 3/1999 | Dobbelstein | 703/21 |
| 5,893,920 A | * | 4/1999 | Shaheen et al. | 711/133 |
| 5,961,582 A | * | 10/1999 | Gaines | 718/1 |
| 6,072,795 A | * | 6/2000 | Poulter | 370/352 |
| 6,199,181 B1 | * | 3/2001 | Rechef et al. | 714/38 |
| 6,385,567 B1 | * | 5/2002 | Lew et al. | 703/27 |
| 6,397,242 B1 | | 5/2002 | Devine | |
| 6,411,276 B1 | * | 6/2002 | Braun et al. | 345/156 |
| 6,651,132 B1 | | 11/2003 | Traut | |
| 6,721,805 B1 | * | 4/2004 | Bhagwat et al. | 709/250 |
| 6,775,793 B2 | | 8/2004 | Deao | |
| 6,782,355 B1 | * | 8/2004 | Cook et al. | 703/23 |
| 6,799,157 B1 | * | 9/2004 | Kudo et al. | 703/28 |
| 6,826,387 B1 | | 11/2004 | Kammer | |
| 6,862,564 B1 | * | 3/2005 | Shue et al. | 703/25 |
| 6,968,307 B1 | * | 11/2005 | Chrysanthakopoulos | 703/27 |

OTHER PUBLICATIONS http://www.pcwebopedia.com/TERM/e/emulation.html.*
http://www.pcwebopedia.com/TERM/s/simulation.html.*
Anderson, William, "An Overview of Motorola's PowerPC Simulator Family", Communications of the ACM, vol. 37, No. 6, Jun. 1994.*
Traut, Eric, "Building the Virtual PC", Core Technologies, Nov. 1997.*
Chernoff et al, "Fx!32 A Profile-Directed Binary Translator", IEEE Micro, vol. 18, Issue: 2, Mar.-Apr. 1998 pp. 56-64.*

(Continued)

*Primary Examiner* — Albert Decady
*Assistant Examiner* — Thomas Stevens

(57) ABSTRACT

An operating environment emulation system includes a separate peripheral emulation system having a memory device. The memory device is operable to store one or more executable programs, referred to as emulators. The emulators are operable to emulate an original operating environment. Multiple emulators may be deployed on the emulation system to allow execution and presentation of an original operating environment on several different host computers. The system also includes a method for connecting the emulation system to a host computer or accessory device upon which the emulation will run. The emulator may employ insulation processes to limit interaction between the emulation system and host computer resources.

4 Claims, 1 Drawing Sheet

OTHER PUBLICATIONS

Hookway et al, "Digital Fx!32 Running 32-Bit x86 Applications on Alpha NT", Compcon '97. Proceedings, IEEE, Feb. 23-26, 1997 pp. 37-42.*
Kubinszky-F., "Emulation of Ad-Hoc Networks on IEEE 802-11" Theis Budapest University Technology and Economics. May 2000. p. 1-75.*
Kubinszky et al., "Emulation of Ad-Hoc Networks on IEEE 802-11" Apr. 2000 p. 1 abstract.*
Internet-Intranet-Infranet: a modular integrating architecture. 1999 p. 81-86.*
Summary Report of the Jul. 1999 meeting of IEEE 802.11 pg. Jul. 1999 IEEE p. 1-3.*
Intellgraphics Device Drivers, Introduction of IEEE 802.11 1995-2007 p. 1-6.*
Goldberg et al., "The PRIM System: An Alternate Architecture for Emulator Development and Use" 1977 ACM pp. 1-6.*
Foxdick-H.,"VM/CMS Handbook for Programmers, Users, and Managers" Hayden Books 1987, p. 3-9,12-14, 105-110.*

\* cited by examiner

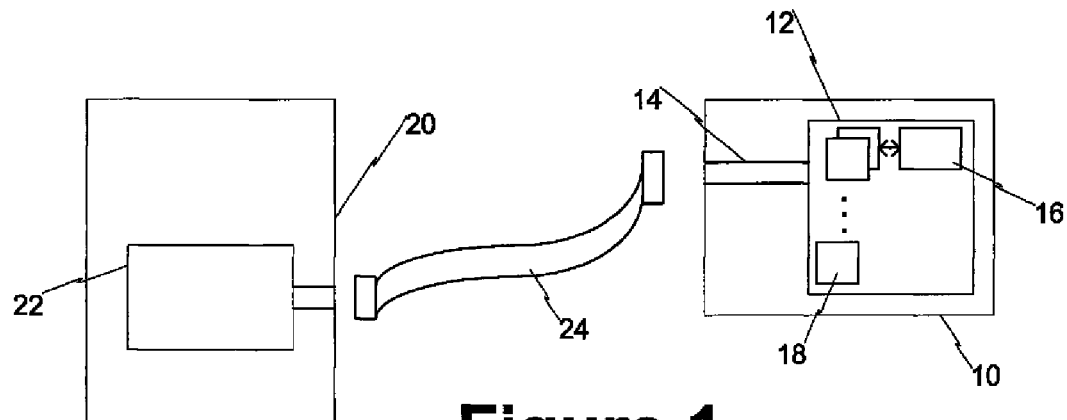
Figure 1
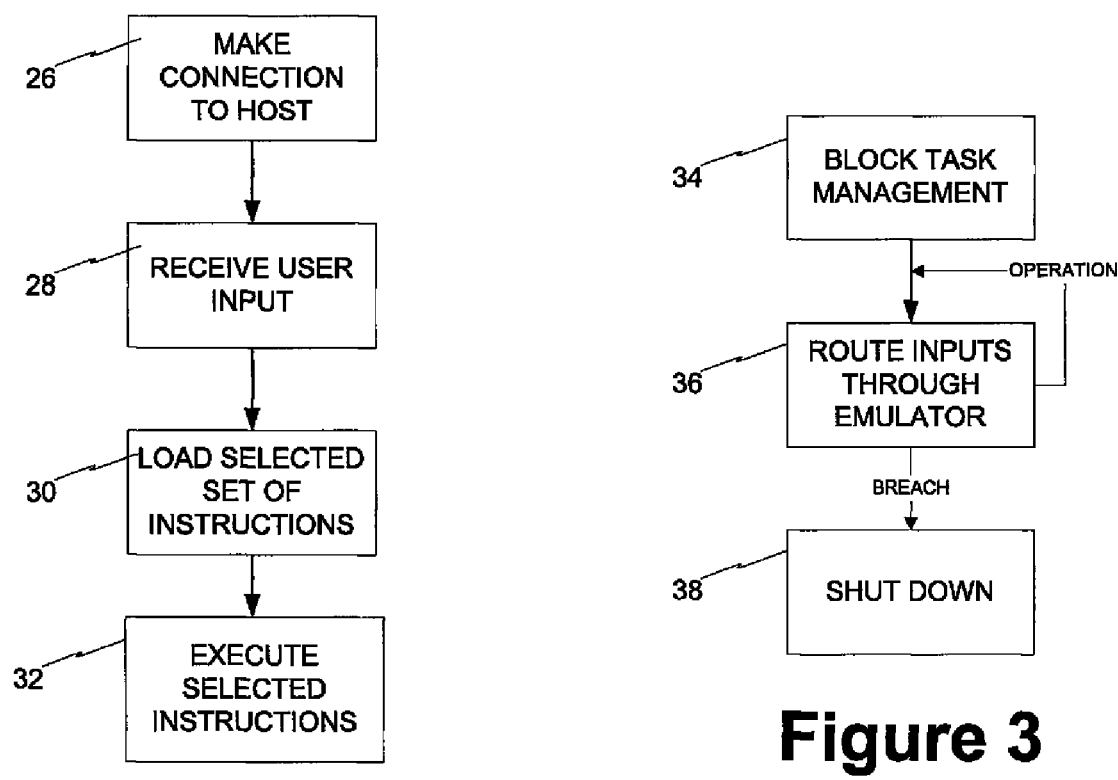
Figure 2
Figure 3

TRANSPORTABLE VOLUME, LOCAL ENVIRONMENT REPOSITORY

This application is a continuation of, and claim priority to, U.S. Provisional Application Ser. No. 60/225,528, filed on Aug. 15, 2000, and is incorporated by reference herein.

BACKGROUND

1. Field

This disclosure relates to an emulator for operating systems, more particularly to a selectable, portable emulator repository.

2. Background

Mobility in computing has become far more important. Notebook, subnotebook and palmtop computing platforms abound. Typically, users employ these devices when traveling and then synchronize their data between a base computer, either at the home or the office. This ensures that their data is updated between the two devices. Other users rely strictly on their portable platform. However, it is sometimes not convenient to carry the portable platform. This leaves the user at a loss if the user travels to a location that does not have a computer with the same operating system of the user's system.

One solution to allowing a user's environment to be simulated is VirtualPC™ software from Connectix, Inc. If a user having PC-compatible system wants to access PC software on a Macintosh computer, that user can run VirtualPC™. This is an example of software that can emulate computing environments. Current implementations target a single host system and are, therefore, not generally portable.

Other users access a base computer remotely. They use Remote Access Servers (RAS) in conjunction with software that allows them to access their base computer. This avoids the problems with synchronizing data and allows access to all of the necessary applications. However, there can be weaknesses in the communication link between the remote computer and the base computer. While they have access to their normal computing environment, they are tied to a particular method, such as a modem, to access that environment.

No method or apparatus exists in the current art that allows a user to save the entire computing environment onto a piece of removable media and access it anywhere. Examples of removable media include not only floppy diskettes and CD-ROMs, but also devices that are cable connected to a host system, such as IOMega Zip Drives™, and PakIt™ by In-System Design. However, these are typically used as mass storage devices and do not emulate a computing environment.

One potential problem with using an emulator that can interact with a host computer is contamination, whether the contamination be from a virus or just involves changing the operating parameters of the host or the emulator. If such an emulator were provided, it would need to insulate the host computer from the emulator and the emulator from the host computer, while providing full functionality of both.

SUMMARY

One aspect of the invention is an operating environment emulation system. The system includes a memory, a connector and at least one set of instructions stored in the memory. The connector allows the emulation system to be connected to a host system. Upon connection, the instructions can be executed, allowing the user to establish a simulated operating environment on the host computer.

BRIEF DESCRIPTION OF THE DRAWINGS

The invention may be best understood by reading the disclosure with reference to the drawings, wherein:

FIG. 1 shows one embodiment of an operating environment emulation system in accordance with the invention.

FIG. 2 shows one embodiment of a method of connecting a memory device with a host computer in order to establish a simulated operating environment in accordance with the invention.

FIG. 3 shows one embodiment of a method of insulating an operating environment emulator from a host computer, in accordance with the invention.

DETAILED DESCRIPTION OF THE EMBODIMENTS

An operating environment emulation system is shown in FIG. 1. This emulation system will be referred to as such, an emulator or a memory device. One of its functions is as a transportable volume acting as a local environment repository. The operating environments it may emulate would be those commonly used by computer users, including Windows™ 95/98/2000/NT, referred to here as Windows™ XX, Unix, Linux and MacIntosh. Those operating systems that run on the IBM-PC compatible standard will be referred to as personal computer (PC) compatible. The system 10 includes a memory 12 and a connector 14.

The memory 12 includes a set of instructions, referred to here as an emulator 18. There may be several versions of the emulator installed in the memory device 12. Each copy of the emulator is intended for a different operating system and/or processor combination on the host computer. The combinations of processor and operating system are only limited by the manner in which the emulators are packaged. For example, there could be an emulator packaged by processor, such as the Intel Pentium 3™. The memory device may have several copies of the emulator on it, one each for Windows XX, Linux and Unix. Alternatively, the emulators could be packaged by operating system, such as one for Windows XX, with several versions for common processors.

Each emulator, then, is a set of instructions to emulate a particular operating environment for a particular processor. The set of instructions are the boot commands, and any other instructions necessary to simulate the operating environment. For example, Windows operating systems generally user application programming interfaces (APIs), dynamic link libraries (DLLs), etc., and object translation tools in operation. These would be included in the instruction set. The instruction sets for each operating system and each processor are typically available, the system designer would just select which combinations would be included as options.

Within the memory device is a data file 16. The data file 16 contains all of the elements of the original operating environment to be simulated by the host computer. The data file will typically remain the same, as it is accessible by the emulators. When connected to the host computer 20, the operating system of the host computer accesses the appropriate packaged emulator, and runs the emulator as a task by executing the instructions, and accesses the data file. Once the data file is accessed, the host computer becomes an emulation of the original operating environment.

It must be noted that the host computer does not have to be a complete personal computer system. The emulator only requires a processor 22 that is running an operating system and a connector. This could include any number of accessories available today, such as palmtop devices, notebook computers, possibly even cellular phones, if the phone has the correct connectors, operating system and processor. These non-PC devices will be referred to as accessory devices.

Similarly, the cable 24 may not be necessary depending upon the standard used to establish communication between the two systems. If the standard used is IEEE (Institute of Electrical and Electronic Engineers) 1394, also known as 'firewire,' or USB (Universal Serial Bus), a cable will be needed. Other types of connections, such as wireless communications in accordance with a given wireless standard such as 802.11b, Ethernet, or infrared connections could also be made. The connectors in those examples would be of the appropriate technology to allow information to pass between the host computer and the emulation system. In some embodiments, a USB cable that can connect directly to the host computer may be the easiest and most convenient configuration. The user can connect the emulation system by simply plugging in the cable to the host computer.

In the below discussion of the operation of the invention, there will be two different operating systems or operating system versions discussed. The host computer to which the emulation system connects and executes the emulator will have an original operating system. This is the operating system under which the host computer is running when the emulator is loaded onto the host computer. The simulated operating system is that operating system being simulated by the emulation system. The two operating systems may be of different types and/or versions, as will be discussed below.

FIG. 2 shows one embodiment of a method of establishing a simulated operating environment upon connection between the memory device and the host computer. At 26, the connection is made. Using a plug-and-play sequence familiar to most users, the host computer will display the new device as an attached memory device, with a list of executable files. The list of executable files is the various versions of the emulators available on the memory device in the emulation system. For example, the user may connect the emulation system as drive 'E:' and display a list of files on that drive. The files may be named so as to make the identification of the appropriate file easy on the user, such as 'Windows XX.exe' or 'Linux.exe.'

The host system receives the user input and loads the version of the emulator desired, from the memory of the emulation system to the host processor at 30. The host processor then executes the selected set of instructions at 32. Upon execution of the selected emulator, the simulated operating environment is established on the host computer or accessory device.

The system allows the user to exactly replicate the typical computing environment in which that user operates. The user may use Windows NT™ at work. Desiring to work at home in the same operating system, the user takes his emulator and plugs it into his home computer. The home computer may have some other member of his family running a task, such as a download in Windows 98™. A pop-up window appears inquiring as to the selection of an executable file from the new device. The user selects the proper emulator. The selection and execution of the proper emulator will cause the host computer to appear to be a Windows NT™ system, even though the original operating system of the host computer is Windows 98™.

In some embodiments, the host computer may identify the proper file and execute it without interaction from the user. For example, the file may be named according to a naming convention of the primary operating system on the host computer or accessory device. The primary operating system would access the file and execute it without waiting for an input from the user.

However selected, the emulator then provides the processor with the necessary data and applications to run as if it were a Windows NT™ system. The user can now move around and perform tasks in the same environment as he uses at work. No preconfiguration or modification of the host computer is necessary to run the simulated operating system.

One concern with this approach is any possible contamination or interference between the emulator and the host computer. FIG. 3 shows a flowchart of one embodiment of a method to prevent this kind of contamination. The set of instructions that comprise the emulator will also operate to insulate the two systems to prevent any inadvertent or intentional interaction between them.

As can be seen in FIG. 3, any type of task management available to the primary operating system will be disabled at 34. For example, the primary operating system may be Windows 98™, as in the above example. In this operating system, it is possible to press ALT-TAB to switch between tasks running in the primary operating system. Other types of task management are available, depending upon the operating system. Conceivably, one could press ALT-TAB while the secondary operating system is running from the emulator and switch to other tasks running on the primary operating system. However, with the emulator software in place, this type of interaction may be prevented.

It is possible that the user may want some sort of interaction between the two systems. For example, the user may have worked on a file at the office that he wants to save onto his home computer. The emulator may allow some sort of user selection to define the nature of allowed interactions. In order to access the underlying system, various types of security could be required, such as passwords. However, for this example, complete insulation will be assumed.

In order to ensure complete insulation, input devices will have to have their interrupts routed to run only through the secondary operating system at 36. Devices such as keyboards, joysticks and mice generate an interrupt or other type of signal that notifies the host processor of an input signal. Once the emulator starts to operate, all input/output signals will be routed through it to allow the emulator to enforce the insulation. This will prevent any contamination and will allow tasks running on the primary operating system to remain undisturbed.

As a failsafe to ensure insulation, an environmental shut down can be provided that allows the host system to protect itself at 38. Inadvertent or intentional actions could cause the insulation between the systems to be breached. If that happens, the emulator will effect an environmental shutdown of the secondary operating system as shown at 38. Otherwise the system continues to operate.

In this manner, users are provided with the ability to preserve a current operating system environment and transport it to another computer or computing device. The emulator can be connected to any computing device with a processor and the proper connector. Users can now transport their local environment with a smaller, lighter, more convenient device than a typical laptop computer.

Thus, although there has been described to this point a particular embodiment for a method and apparatus for an operating environment emulation system, it is not intended that such specific references be considered as limitations upon the scope of this invention except in-so-far as set forth in the following claims.

What is claimed is:

1. A method of insulating an operating environment emulator from a host computer, the method comprising:

connecting a memory device to a host computer having an original operating system stored on a storage device of the host computer and a host processor, wherein the original operating system is executing on the host processor;

selecting a secondary operating system to be emulated from multiple emulated operating systems stored on the connected memory device;

selecting a secondary operating system emulator from a plurality of secondary operating system emulators, wherein the selected secondary operating system emulator comprises instructions configured to emulate the secondary operating system using the original operating system and the host processor;

executing the selected secondary operating system emulator on the host processor and original operating system of the host computer;

disabling host task management on the original operating system;

insulating the original operating system from the secondary operating system by routing input/output signals through the secondary operating system; and disabling the secondary operating system in response to a breach of the insulated original operating system by an input/output signal being routed to the original operating system while the original operating system is insulated.

2. The method of claim 1, wherein disabling further comprises completely isolating the host computer.

3. The method of claim 1, wherein disabling further comprises allowing a user to define allowed interactions between the host computer and the emulation device.

4. The method of claim 1, wherein the selection is based on a type of the original operating system and a type of the host processor.

* * * * *